United States Patent
Carlioz

(10) Patent No.: US 10,358,220 B2
(45) Date of Patent: Jul. 23, 2019

(54) SEAT UNIT FOR A VEHICLE CABIN

(71) Applicant: Safran Seats, Plaisir (FR)

(72) Inventor: Victor Carlioz, Pismo Beach, CA (US)

(73) Assignee: Safran Seats, Plaisir (FR)

( * ) Notice: Subject to any disclaimer, the term of this patent is extended or adjusted under 35 U.S.C. 154(b) by 238 days.

(21) Appl. No.: 15/031,617

(22) PCT Filed: Oct. 24, 2014

(86) PCT No.: PCT/US2014/062182
§ 371 (c)(1),
(2) Date: Apr. 22, 2016

(87) PCT Pub. No.: WO2015/061688
PCT Pub. Date: Apr. 30, 2015

(65) Prior Publication Data
US 2016/0272323 A1    Sep. 22, 2016

Related U.S. Application Data

(60) Provisional application No. 61/895,090, filed on Oct. 24, 2013.

(51) Int. Cl.
*B64D 11/06* (2006.01)
*B64D 11/00* (2006.01)

(52) U.S. Cl.
CPC ...... *B64D 11/0601* (2014.12); *B64D 11/0015* (2013.01); *B64D 11/0602* (2014.12);
(Continued)

(58) Field of Classification Search
CPC ............ B64D 11/0601; B64D 11/0015; B64D 11/064; B64D 11/0646; B64D 11/0639;
(Continued)

(56) References Cited

U.S. PATENT DOCUMENTS 2,722,267 A * 11/1955 Liljengren ............. A47C 7/285
267/112
2,799,321 A * 7/1957 Liljengren ............. B60N 2/242
296/64

(Continued)

FOREIGN PATENT DOCUMENTS

CN    102753436 A    10/2012
CN    102849212 A    1/2013
(Continued)

OTHER PUBLICATIONS

International Patent Application No. PCT/US2014/062182, International Preliminary Report on Patentability dated May 6, 2016, 11 pages.

(Continued)

*Primary Examiner* — Valentina Xavier
(74) *Attorney, Agent, or Firm* — Kilpatrick Townsend & Stockton LLP; Dean W. Russell; Tiffany L. Williams

(57) ABSTRACT

Two seats (16) are arranged facing in opposing directions, wherein each seat comprises a seat back (40), a headrest (48), and a seat pan (42). Each seat is configured to convert between a seat position and a bed position. A partition (18) is positioned between the two seats.

18 Claims, 14 Drawing Sheets

(52) U.S. Cl.
CPC ........ *B64D 11/0604* (2014.12); *B64D 11/064* (2014.12); *B64D 11/0606* (2014.12); *B64D 11/0639* (2014.12); *B64D 11/0641* (2014.12); *B64D 11/0644* (2014.12); *B64D 11/0646* (2014.12); *B64D 2011/0069* (2013.01)

(58) Field of Classification Search
CPC ............ B64D 11/0602; B64D 11/0644; B64D 11/0606; B64D 11/0604; B64D 11/0641; B64D 2011/0069
See application file for complete search history.

(56) References Cited

U.S. PATENT DOCUMENTS

| | | | |
|---|---|---|---|
| 4,913,487 A * | 4/1990 | Breckel | A47C 9/06 297/14 |
| 7,178,871 B1 | 2/2007 | Round et al. | |
| 9,446,849 B1 * | 9/2016 | Pinkal | B64D 11/064 |
| 2007/0040434 A1 * | 2/2007 | Plant | B60N 2/34 297/354.13 |
| 2009/0302158 A1 * | 12/2009 | Darbyshire | B64D 11/06 244/118.6 |
| 2010/0065683 A1 * | 3/2010 | Darbyshire | B64D 11/06 244/118.6 |
| 2012/0292957 A1 | 11/2012 | Vergnaud et al. | |
| 2012/0298798 A1 * | 11/2012 | Henshaw | B64D 11/06 244/118.6 |
| 2012/0305705 A1 | 12/2012 | Vergnaud et al. | |
| 2012/0313406 A1 | 12/2012 | Darbyshire et al. | |
| 2013/0002001 A1 * | 1/2013 | Allen | B60N 3/101 297/411.3 |
| 2013/0175393 A1 | 7/2013 | Udriste et al. | |
| 2015/0136904 A1 * | 5/2015 | Savard | B64D 11/06 244/118.6 |
| 2017/0327232 A1 * | 11/2017 | Morgan | B64D 11/0606 |

FOREIGN PATENT DOCUMENTS

| | | |
|---|---|---|
| JP | 2002527288 | 8/2002 |
| JP | 2008510554 | 4/2008 |
| JP | 2009504510 | 2/2009 |
| JP | 2009520638 | 5/2009 |
| JP | 2012516184 | 7/2012 |
| JP | 2015507576 | 3/2015 |
| JP | 2015516327 | 6/2015 |
| JP | 2015529593 | 10/2015 |
| WO | 2006021766 | 3/2006 |
| WO | 2007024776 | 3/2007 |
| WO | 2007072045 | 6/2007 |
| WO | 2010086785 | 8/2010 |
| WO | 2013142181 | 9/2013 |
| WO | 2014022484 | 2/2014 |

OTHER PUBLICATIONS

Chinese Patent Application No. 201480058749X, Office Action and Search Report (and translation) dated May 31, 2017.
International Patent Application No. PCT/US2014/062182 Invitation to Pay Additional Fees and, Where Applicable, Protest Fee dated Jan. 19, 2015.
International Patent Application No. PCT/US2014/062182 Search Report and Written Opinion dated May 27, 2015.
Chinese Patent Application No. 201480058749X, Notice of Allowance and Search Report (including English translation) dated Jun. 21, 2018.
Japanese Patent Application No. 2016-526192, Office Action (including English translation) dated Jun. 26, 2018.
European Patent Application No. 14793741.1, Communication pursuant to Article 94(3) EPC (examination report) dated Aug. 10, 2018.
Japan Patent Application No. 2016-526192, Office Action dated Nov. 6, 2018.

* cited by examiner

SEAT UNIT FOR A VEHICLE CABIN

CROSS REFERENCE TO RELATED APPLICATIONS

This application is the U.S. national phase entry of International Patent Application Serial No. PCT/US2014/062182 ("the '182 application"), filed on Oct. 24, 2014, which application is related to and claims priority benefits from U.S. Provisional Application Ser. No. 61/895,090 ("the '090 application"), filed on Oct. 24, 2013, entitled LLounge Concept. The '182 and '090 applications are hereby incorporated in their entireties by this reference.

FIELD OF THE INVENTION

The invention relates to seat units for vehicle cabins, particular seat units comprising two seats arranged in opposing directions.

BACKGROUND

As is well-known, business class aircraft seats offer passengers different comfort positions, from the seat position to a bed position that is substantially horizontal in flight.

Business class aircraft seat units have also been designed that offer both forward and aft facing seats, which are usually overlapping with one another to take advantage of the additional space at one passenger's feet to provide additional space for another passenger's upper body. Furthermore, these arrangements typically do not provide secondary seating arrangements for visiting passengers.

These business seat units are typically a conventional width used for business class passenger seats and therefore do not provide other options for passengers to be seated with their bodies in multiple orientations relative the orientation of the seat.

Thus, it may be desirable to provide a seat unit having forward and aft facing arrangements that do not require any overlapping designs for bed positions. It may also be desirable to provide a seat unit having room for secondary seating for visiting passengers. It may further be desirable to provide a seat unit in which each seat is designed to accommodate multiple seating orientations.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat unit comprises two seats arranged facing one another, the two seats being substantially laterally aligned with each other and with respect to a longitudinal axis of the seat unit, a partition positioned between the two seats, wherein the partition comprises two footwells arranged facing in opposing directions so that an opening in each footwell is accessible by a passenger seated in one of the two seats that faces the opening in the footwell, and each seat comprises a seat back, a headrest, and a seat pan, wherein each of the two seats is configured to convert between a seat position and a bed position.

In some embodiments, each of the two footwells comprises an enclosed portion having an upper surface that is configured as a table for use by a passenger seated in the one of the two seats that does not face the opening of the corresponding footwell.

In certain embodiments, the partition may further comprise an upper wall that extends above the two footwells, wherein a monitor is mounted to the upper wall. The monitor may be slidingly mounted to transition from a stowed location above the footwell with the opening facing away from the seat that faces the monitor to a deployed position above the footwell with the opening facing the seat that faces the monitor.

In some embodiments, an upper surface of each of the two footwells may also form a secondary seat when the seat facing the opening in the footwell is in the seat position.

According to some embodiments, the bed position comprises a bed surface formed by at least a stationary lower surface of the footwell, the seat pan, and the seat back in a substantially horizontal position.

Each of the two seats may further comprise at least one armrest coupled to a side wall of a shell partially surrounding each of the two seats. The at least one armrest may slide down into a refracted position substantially aligned with the bed surface. The at least one armrest may also be positioned so that an upper surface of the at least one armrest is substantially aligned with an upper surface of the seat back in the seat position. In some embodiments, the seat back may comprise at least one pivotally attached cushion that pivots outward into a position to form a supplemental armrest.

According to certain embodiments of the present invention, a seat unit comprises two primary seats arranged facing in opposing directions, wherein each seat comprises a seat back, a headrest, and a seat pan, and is configured to convert between a seat position and a bed position, and a partition positioned between the two primary seats, wherein the partition comprises two secondary seats arranged facing in opposing directions, wherein each secondary seat is also arranged facing one of the two primary seats.

In certain embodiments, the partition further comprises an upper wall that extends above the two secondary seats, wherein a monitor is mounted to the upper wall. The monitor may be slidingly mounted to transition from a stowed location above the secondary seat that faces away from the seat that faces the monitor to a deployed position above the secondary seat facing the seat that faces the monitor.

According to some embodiments, the bed position comprises a bed surface formed by at least a stationary lower surface of the secondary seat, the seat pan, and the seat back in a substantially horizontal position.

Each of the two primary seats may further comprise at least one armrest coupled to a side wall of a shell partially surrounding each of the two primary seats. In some embodiments, the at least one armrest slides down into a retracted position substantially aligned with the bed surface.

According to certain embodiments of the present invention, a seat unit comprises two seats arranged facing in opposing directions, the two seats being oriented substantially parallel to a longitudinal axis of the seat unit, wherein each of the two seats has a width that is configured for a passenger to be seated in multiple orientations within each seat, which range from having his or her body oriented in a direction that is substantially parallel to the longitudinal axis of the seat unit to having his or her body oriented in a direction that is substantially perpendicular to the longitudinal axis of the seat unit.

In some embodiments, the seat unit further comprises a partition positioned between the two seats, the partition comprising two secondary seats arranged facing in opposing directions, wherein each secondary seat is also arranged facing one of the two seats. Each of the two seats may further comprise a seat back and at least one armrest coupled to a side wall of a shell partially surrounding each of the two seats, the at least one armrest positioned so that an upper surface of the at least one armrest is substantially aligned with an upper surface of the seat back in a seat position. In some embodiments, the seat back may comprise at least one pivotally attached cushion that pivots outward into a position to form a supplemental armrest.

According to certain embodiments of the present invention, a seat unit comprises at least one seat comprising a seat back, a headrest separated from the seat back, and a seat pan, wherein the at least one seat is configured to convert between a seat position and a bed position.

BRIEF DESCRIPTION OF THE DRAWINGS

In the following detailed description, embodiments of the invention are described referring to the following figures.

DETAILED DESCRIPTION

Figure 1:
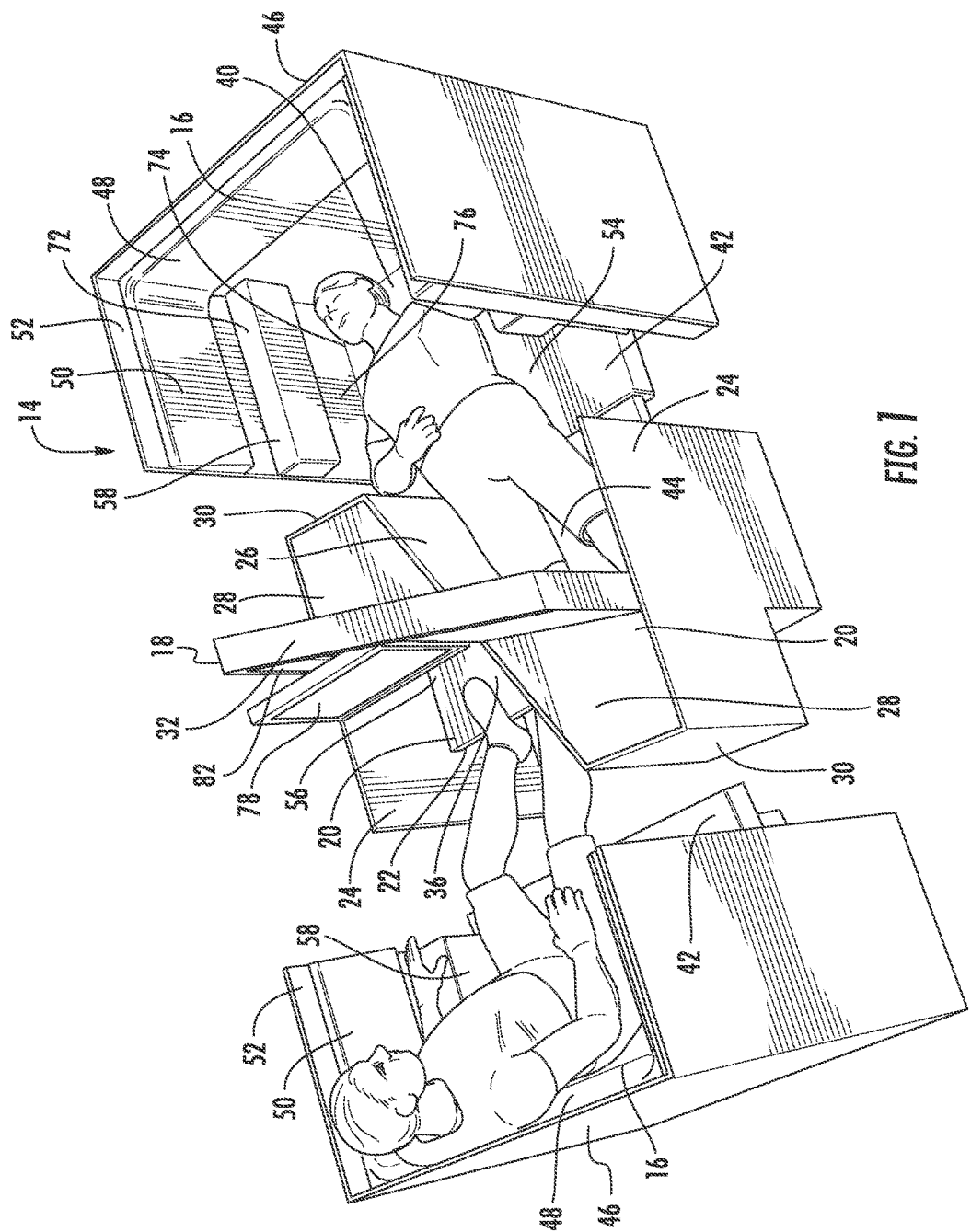
FIG. 1 is a perspective view of a seat unit, according to certain embodiments of the present invention.
Figure 2:
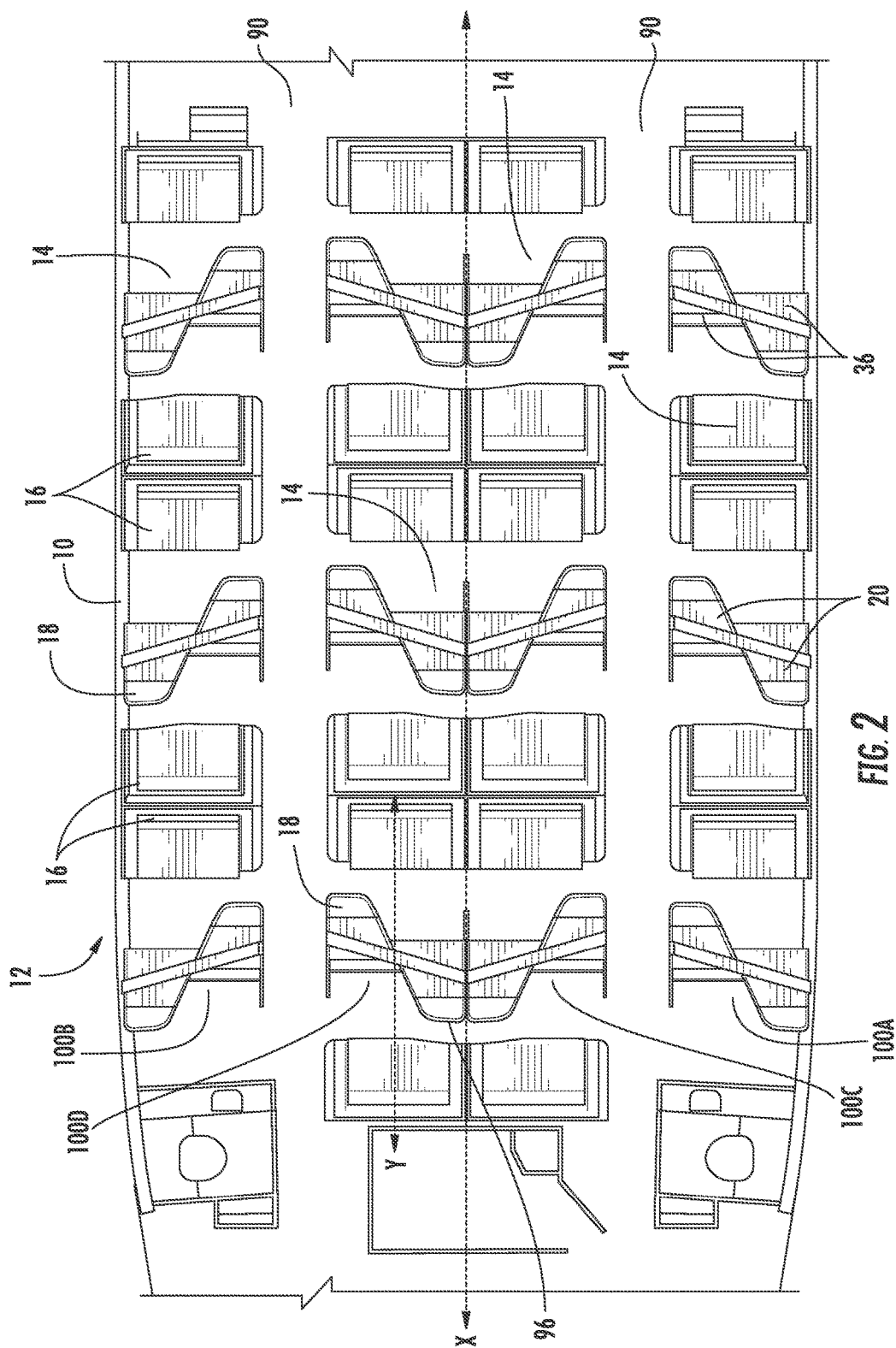
FIG. 2 is a top view of a cabin comprising an arrangement of a plurality of seat units, according to certain embodiments of the present invention.
Figure 3:
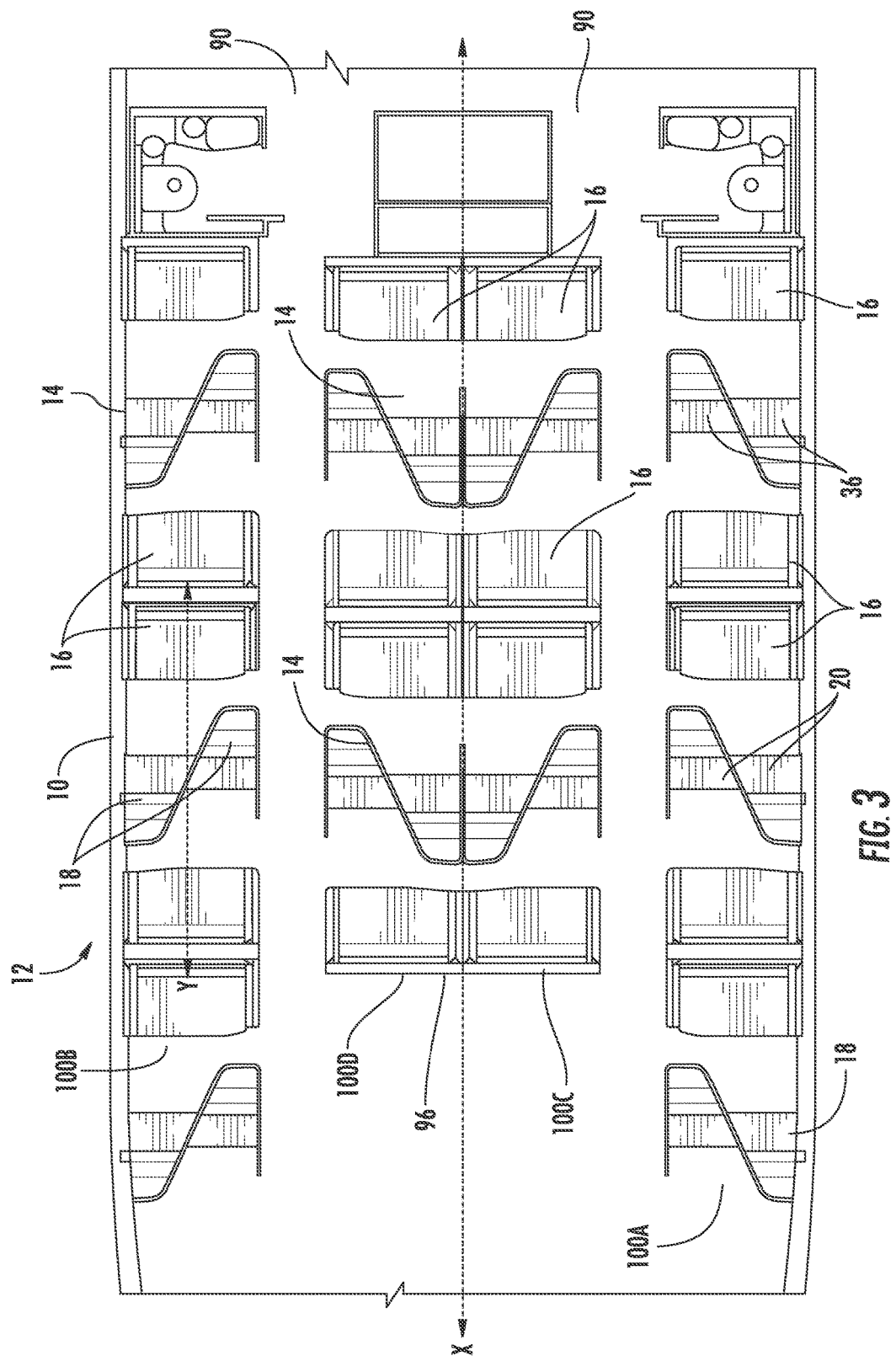
FIG. 3 is a top view of a cabin comprising another arrangement of a plurality of seat units, according to certain embodiments of the present invention.
Figure 4:
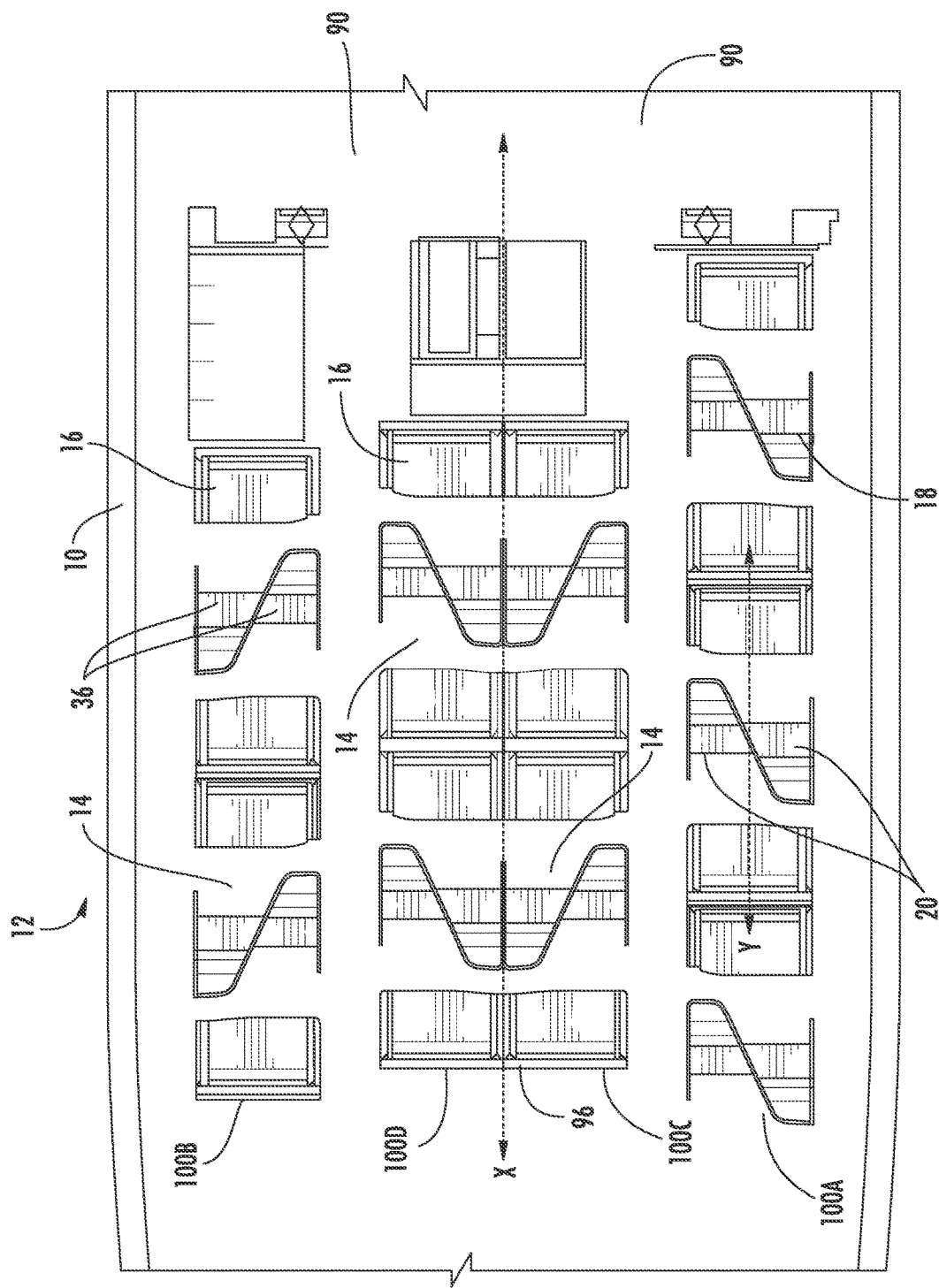
FIG. 4 is a top view of a cabin comprising another arrangement of a plurality of seat units, according to certain embodiments of the present invention.
Figure 5:
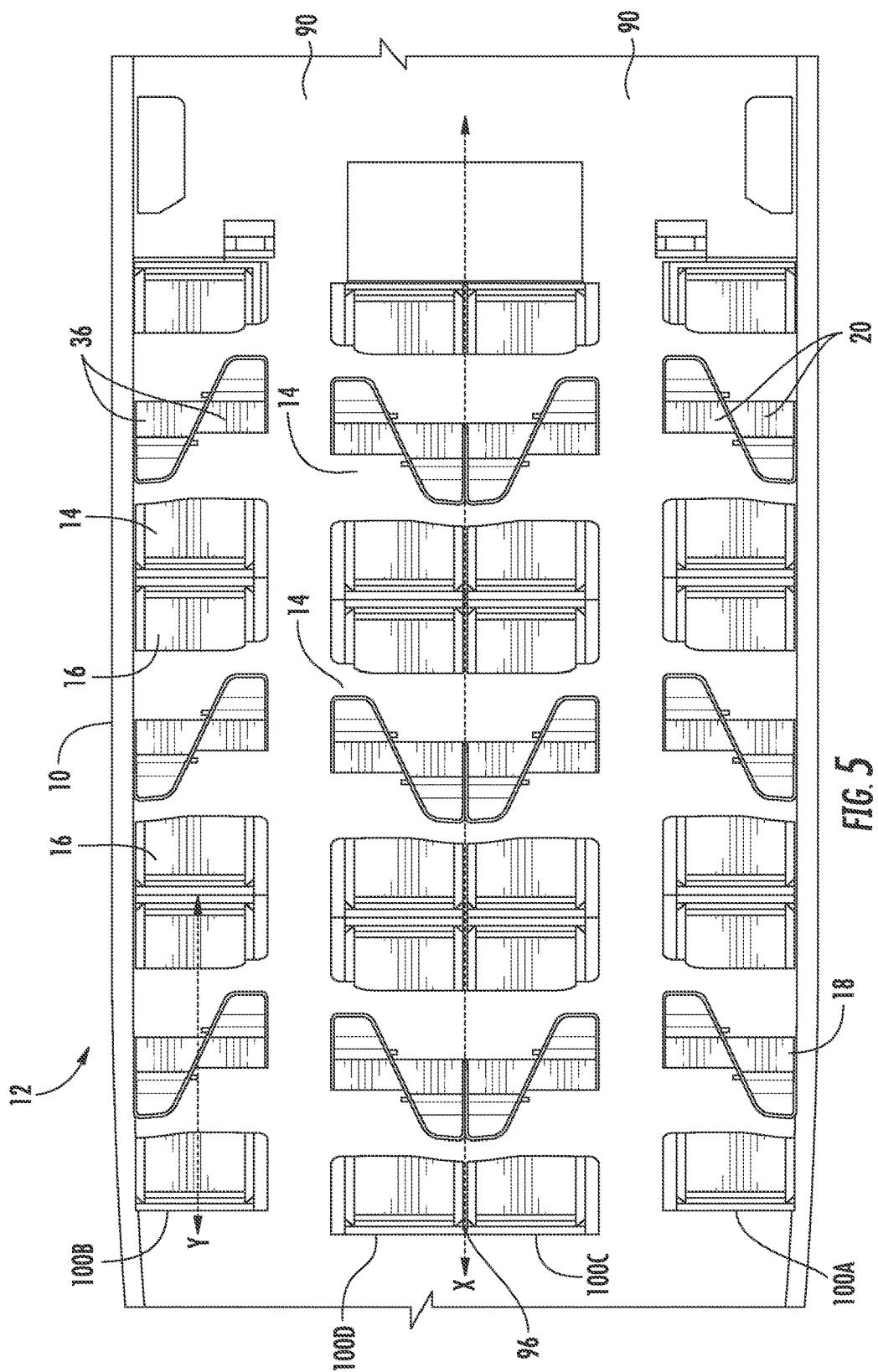
FIG. 5 is a top view of a cabin comprising another arrangement of a plurality of seat units, according to certain embodiments of the present invention.
Figure 6:
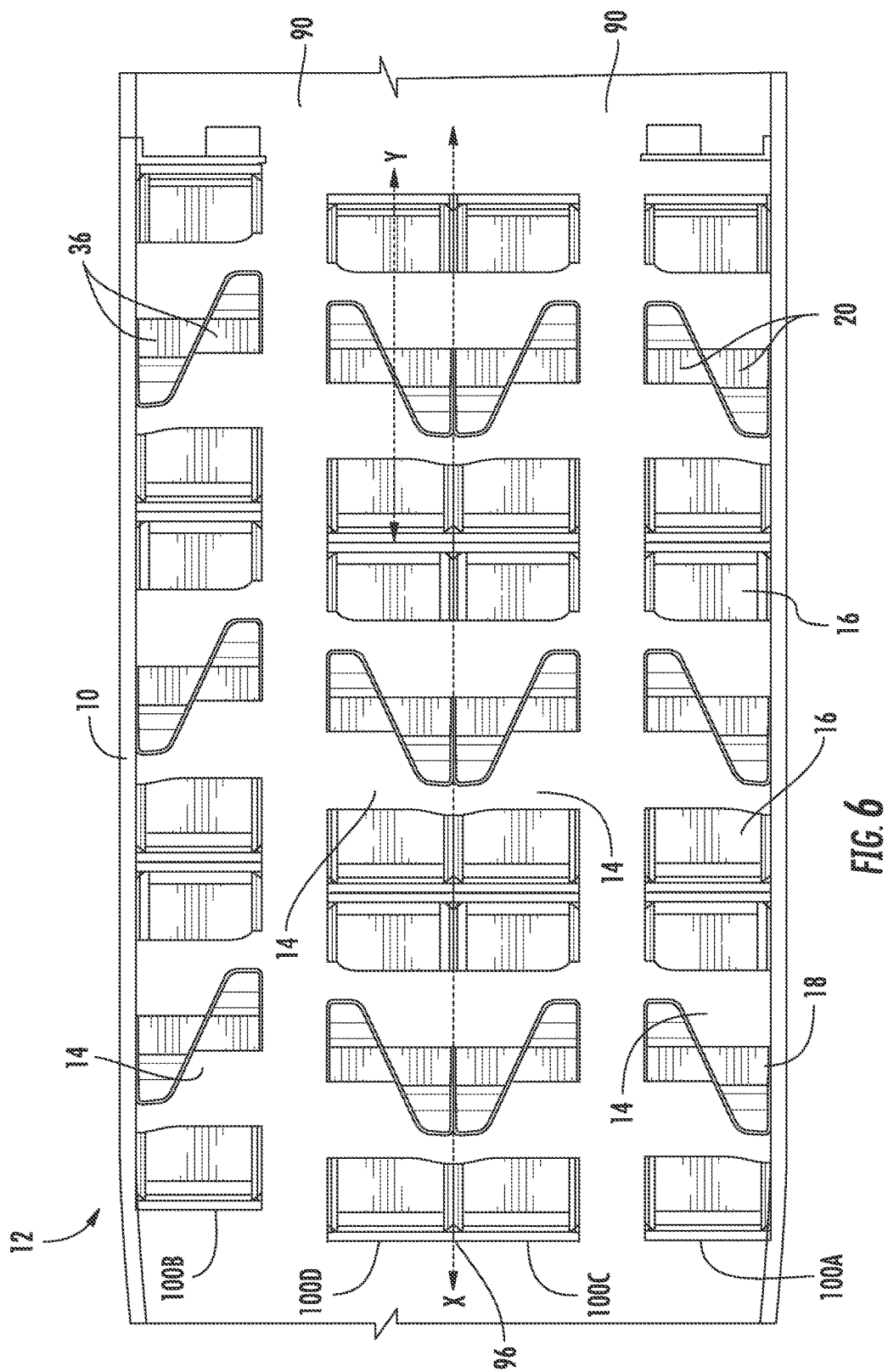
FIG. 6 is a top view of a cabin comprising another arrangement of a plurality of seat units, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of seat units may be described with reference to an aircraft cabin, they are by no means so limited. In fact, the seat units may be used in conjunction with any type of vehicle cabin or otherwise as desired.

According to certain embodiments of the present invention, as illustrated in FIGS. 1-15, a cabin 10 comprises an arrangement 12 formed by a plurality of seat units 14, each seat unit 14 comprising two seats 16, wherein the seats 16 are arranged to face one another, and a partition 18 is positioned between the seats 16. Each seat 16 may be arranged so that it is substantially laterally aligned with the other seat 16 with respect to a longitudinal axis Y of the seat unit 14.

The partition 18 comprises two footwells 20 arranged in opposing directions so that an opening 56 in each footwell 20 is accessible by a passenger seated in the seat 16 that faces the opening 56 in the footwell 20 (i.e., the mating seat 16).

While the seat units 14 may be discussed with reference to two seats 16, they are by no means so limited. For example in certain embodiments, such as at the ends of the cabin 10, the seat unit 14 may comprise one seat 16 with one footwell 20 in front of it inside a front row monument.

Each footwell 20 may comprise a stationary lower surface 22 and vertically oriented sides 24, 26. In certain embodiments, the vertically oriented side 24 of each footwell 20 forms at least a portion of an outer wall of the partition 18. As a result, the vertically oriented sides 24 may be arranged substantially parallel to a longitudinal axis X of the cabin 10.

In some embodiments, the two footwells 20 share the same inner vertically oriented side 26. The side 26 may be laterally angled so that the lateral dimension of each footwell 20 is wider at the opening 56 closer to the mating seat 16, and narrower at an opposing end of the footwell 20.

Each footwell 20 may be further enclosed by an upper surface 28 and a rear surface 30. The upper surface 28 of each footwell 20 may also serve as a table top, work surface, dining surface, cocktail table, or other usable surface for a passenger seated in the opposing seat 16 (i.e., the seat 16 that does not have access to the opening 56 in the footwell 20). The portion of the footwell 20 that is enclosed by the upper surface 28 and the rear surface 30 may extend into the space occupied by a passenger seated in the opposing seat 16. The space allotted to each passenger in the seat unit 14 may be further separated by an upper wall 32 that forms a portion of the partition 18 that extends above the footwells 20 and provide a location for mounting monitors 78 (as described in detail below), other electronic devices, and/or other stowage compartments.

The stationary lower surface 22 of each footwell 20 forms a lower surface of the enclosed portion that extends into the space of a passenger seated in the opposing seat 16, and may be configured to extend beyond the enclosed portion and upper wall 32 into the space of a passenger seated in the mating seat 16. The sides 24 and 26 may also be configured to extend a similar distance into the space of the passenger seated in the mating seat 16. As a result, the stationary lower surface 22 may be used as an ottoman by a passenger seated in the mating seat 16, and may also be used as a secondary seat 36 for another passenger to visit or work with a passenger seated in the mating seat 16 (or primary seat 16 that faces the secondary seat 36). The configuration of the secondary seat 36 and the mating seat 16 therefore has the feel of an open space with a small couch facing a reading chair, similar to that of a conventional living room.

Each seat 16 comprises a seat back 40, a seat pan 42, and a leg rest 44, which are partially surrounded by a shell 38. Furthermore, each seat 16 is configured to convert between a seat position (as best illustrated in FIGS. 1, 7-10, and 15) and a bed position that is substantially horizontal in flight (as best illustrated in FIGS. 1 and 7-10).

In the seat position, as illustrated in FIGS. 1, 7-10, and 15, the seat back 40 is positioned so that the seat back 40 is substantially vertical and positioned adjacent a rear wall 46 of the shell 38. To transition the seat 16 into the bed position, as shown in FIGS. 1, 7-10, and 15, the leg rest 44 is raised into a substantially horizontal position, the leg rest 44 and the seat pan 42 are moved toward the partition 18, and the seat back 40 slides down and toward the partition 18 until the seat back 40 is also substantially horizontal. The stationary lower surface 22 of each footwell 20 is positioned at a height that substantially aligns and mates with the leg rest 44 in the bed position so that the combination of the stationary lower surface 22, the leg rest 44, the seat pan 42, and the seat back 40 form a bed surface 54 that utilizes substantially all of the available space allocated within the seat unit 14 for each seat 16.

Figure 7:
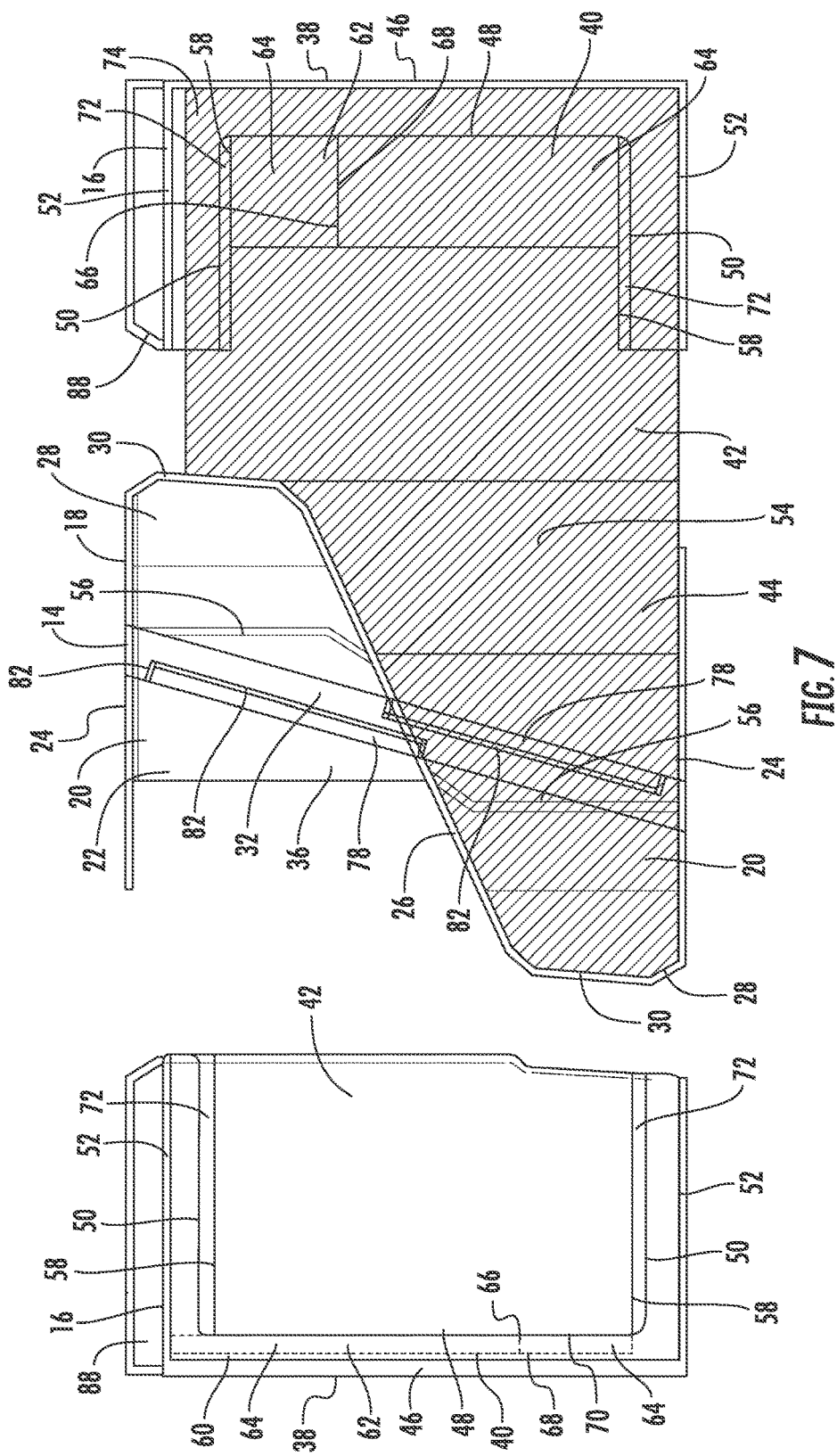
FIG. 7 is a top view of a seat unit showing one of the seats in a bed position, according to certain embodiments of the present invention.
Figure 8:
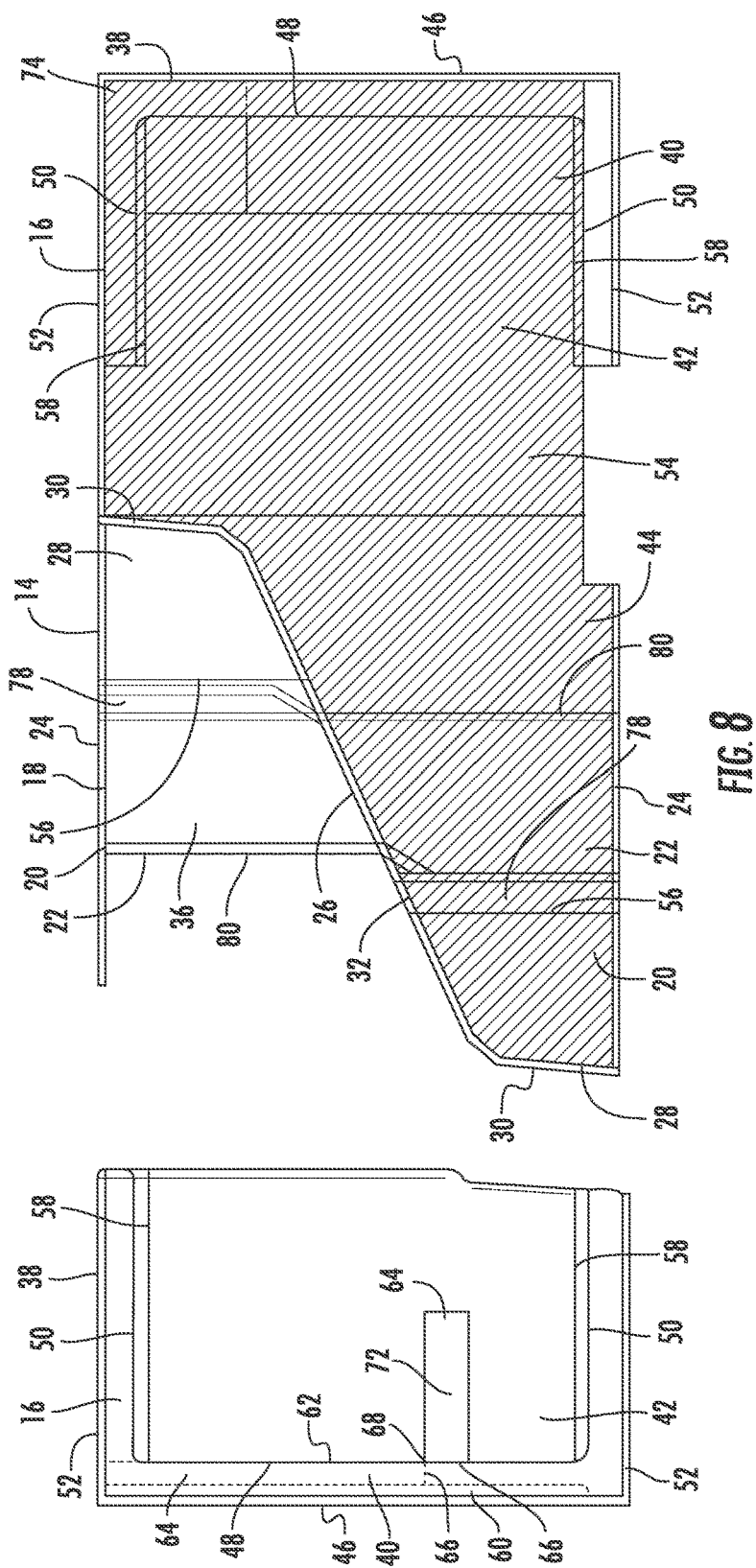
FIG. 8 is a top view of a seat unit showing one of the seats in a bed position, according to certain embodiments of the present invention.

For example, in certain embodiments as shown in FIG. 7, the bed surface may comprise an area of 2200 in$^2$ with a longest diagonal length of 81.2 in. In other embodiments, as shown in FIG. 8, the bed surface may comprise an area of 1961 in$^2$ with a longest diagonal length of 82.2 in. In these embodiments, the angled design of the side 26 of each footwell 20 allows the footwell 20 to be more easily accessed by a passenger lying along the longest diagonal length of the bed surface 54. In other embodiments, the pitch of the seat unit 14 may be shorter or longer as needed or desired, which will also result in bed lengths that are shorter or longer.

The shell 38 may further comprise at least one headrest cushion 48, which may be positioned on the rear wall 46 at a location that is above and slightly spaced apart or separated from the seat back 40 when the seat 16 is in the seat position. The headrest cushion 48 may be coupled to the rear wall 46 in a fixed location on the rear wall 46 so that the headrest cushion 48 is separated from the seat back 40 and the rest of the seat 16.

In additional embodiments, the headrest cushion 48 may be coupled to the seat back 40 of each seat 16 via a kinematic so that the headrest cushion 48 moves with the seat back 40 and also converts into the bed position along with the rest of the seat 16. In other words, the seat 16 may comprise a two-piece upper surface comprising a seat back 40 and a separate headrest cushion 48 or may comprise a combination of the headrest cushion 48 coupled to the seat back 40, but still separated from one another by a gap.

In the embodiments where the headrest cushion 48 is linked to the seat back 40, the leg rest 44 may be eliminated and the stationary lower surface 22 may be configured to have a larger surface area and/or to be extendible toward the facing seat 16 so that the stationary lower surface 22 substantially aligns and mates with the seat pan 42 in the bed position (instead of with the leg rest 44). As a result, the combination of the stationary lower surface 22, the seat pan 42, the seat back 40, and the headrest cushion 48 form a bed surface 54 that utilizes substantially all of the available space allocated within the seat unit 14 for each seat 16.

The shell 38 may further comprise at least one headrest cushion 50 positioned on each side wall 52 of the shell 38. The headrest cushion 50 may be vertically aligned with the height of the headrest cushion 48 or may be at different heights as needed or desired.

An armrest cushion 58 may be positioned on each side wall 52 of the shell 38 that is below and slightly spaced apart from the headrest cushion 50. One or both armrest cushions 58 may be positioned at a height that substantially aligns with a height of the seat back 40 when the seat 16 is in the seat position or may be at different heights as needed or desired.

Figure 14:
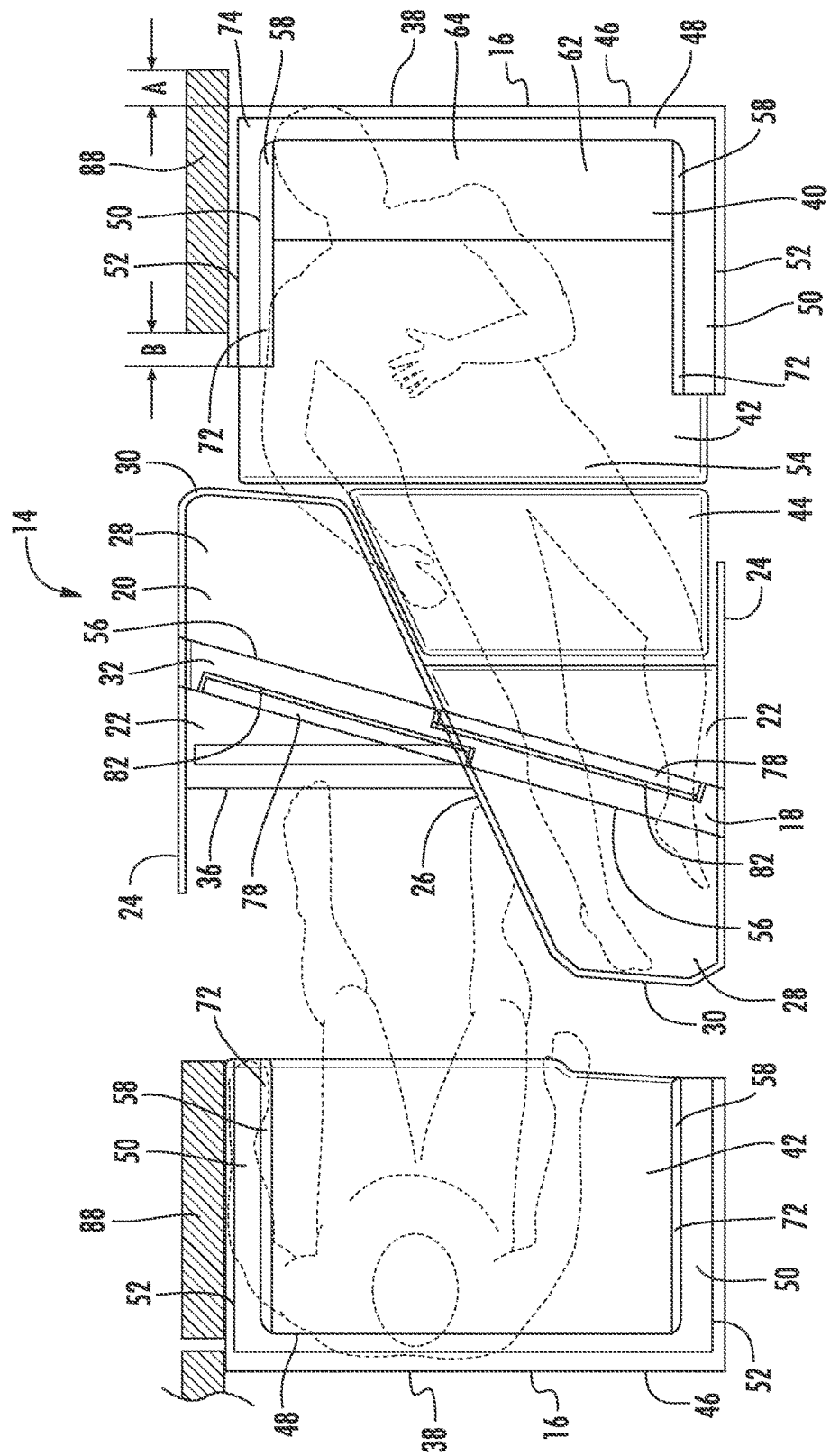
FIG. 14 is a top view of a seat unit showing an overlapping closet arrangement, according to certain embodiments of the present invention.

As shown in FIG. 14, the seat 16 in the seat position has a width that is wider than a conventional business class passenger seat, the wider dimension allowing a passenger to be seated in multiple orientations. For example, a passenger may be seated so as to have his or her body oriented in a direction that is substantially parallel to the longitudinal axis Y of the seat unit 14, or the passenger may be seated so as to have his or her body oriented in a direction that is angled (or even substantially perpendicular) to the longitudinal axis Y of the seat unit 14. The arrangement of the armrests 58 at the height of the seat back 40 when the seat 16 is in the seat position, as well as the spacing between the seat back 40 and headrest cushion 48, allows a passenger to use to the seat back 40 as an armrest when the passenger is seated at an angle to the longitudinal axis Y.

Furthermore, the seat back 40 may comprise a base structure 60 to which a support surface 62 is attached. In certain embodiments, the support surface 62 comprises at least two cushions 64. The first cushion 64 is shaped and positioned to substantially cover a first portion of the base structure 60, and the second cushion 64 is shaped and positioned to substantially cover a second portion of the base structure 60. A vertically oriented end 66 of the first cushion 64 may be attached to a vertically oriented end 66 of the second cushion 64 and/or may be attached to the base structure 60. The remaining edges and surface of the first cushion 64 may be unattached, thus allowing the first cushion 64 to pivot away from the base structure 60 via the connection at its end 66, as shown in FIG. 8.

Likewise, in certain embodiments, the second cushion 64 may be attached to the vertically oriented end 66 of the first cushion 64 and/or may be attached to the base structure 60.

The remaining edges and surface of the second cushion 64 may be unattached, thus allowing the second cushion 64 to also pivot away from the base structure 60 via the connection at its end 66.

In other embodiments, only one cushion 64 is pivotally attached as described above, and the other cushion 64 is secured to the base structure 60 along other edges and/or surface so that the other cushion 64 is not configured to pivot away from the base structure 60.

In certain embodiments, the first cushion 64 is smaller in lateral dimensions than the second cushion 64 so that the second cushion 64 has a lateral dimension that approximates that of a traditional passenger seat, which prevents a pivot seam 68 (formed where the two vertically oriented end 66 meet) from being located behind a passenger seated in front of the second cushion 64.

Because the seat 16 is designed to be wider than a traditional passenger seat, an average passenger may not be able to use both armrests 58 at the same time. Thus, as illustrated in FIGS. 7-8, the use of a pivoting design for at least one of the cushions 64 allows the cushion to be rotated into a position adjacent a side of the passenger seated in front the other cushion 64 so that the passenger may use an upper surface 70 of the rotated cushion 64 as a supplemental armrest.

Figure 9:
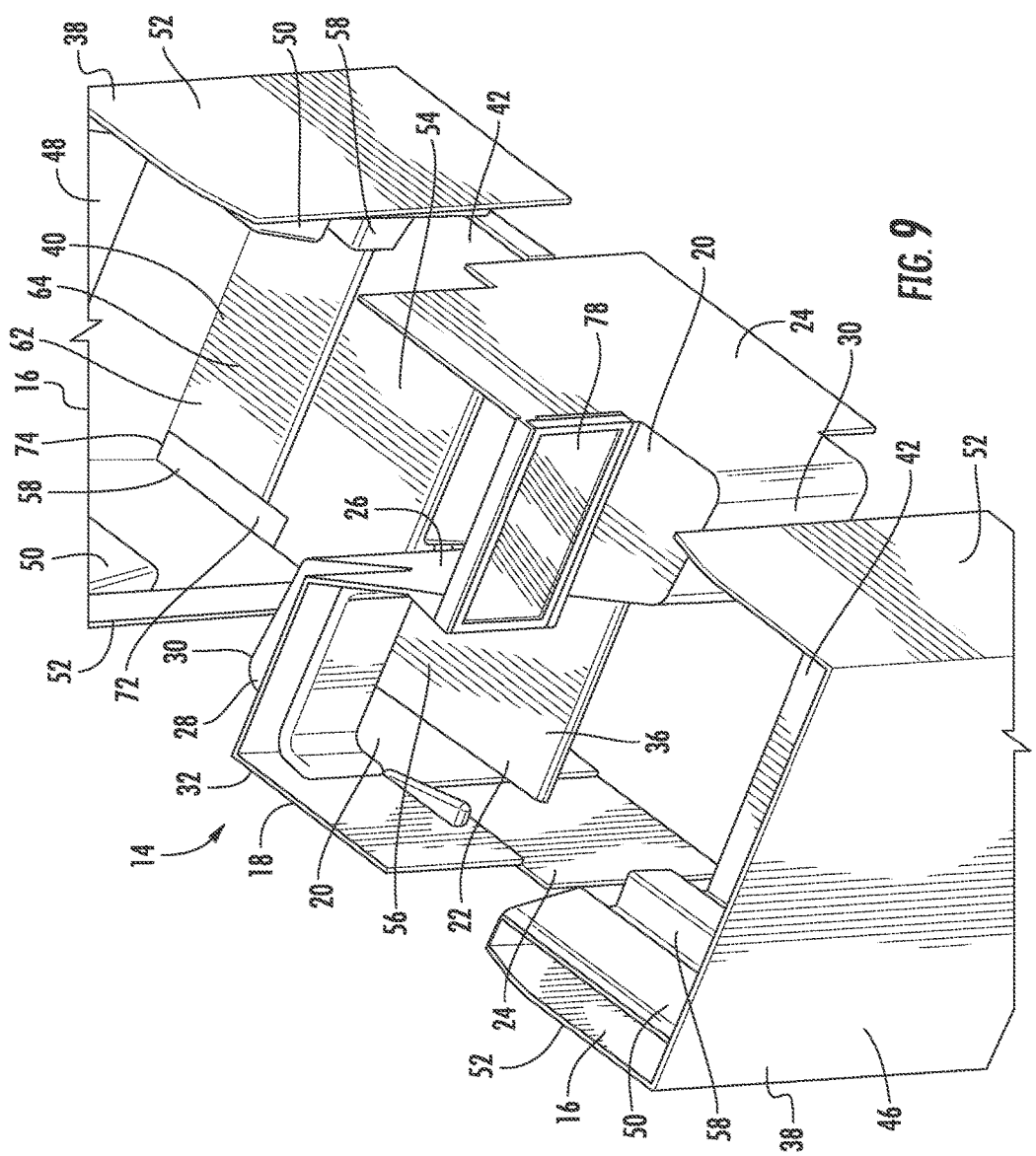
FIG. 9 is a perspective view of a seat unit showing one of the seats in a bed position and a monitor in a stowed position, according to certain embodiments of the present invention.
Figure 10:
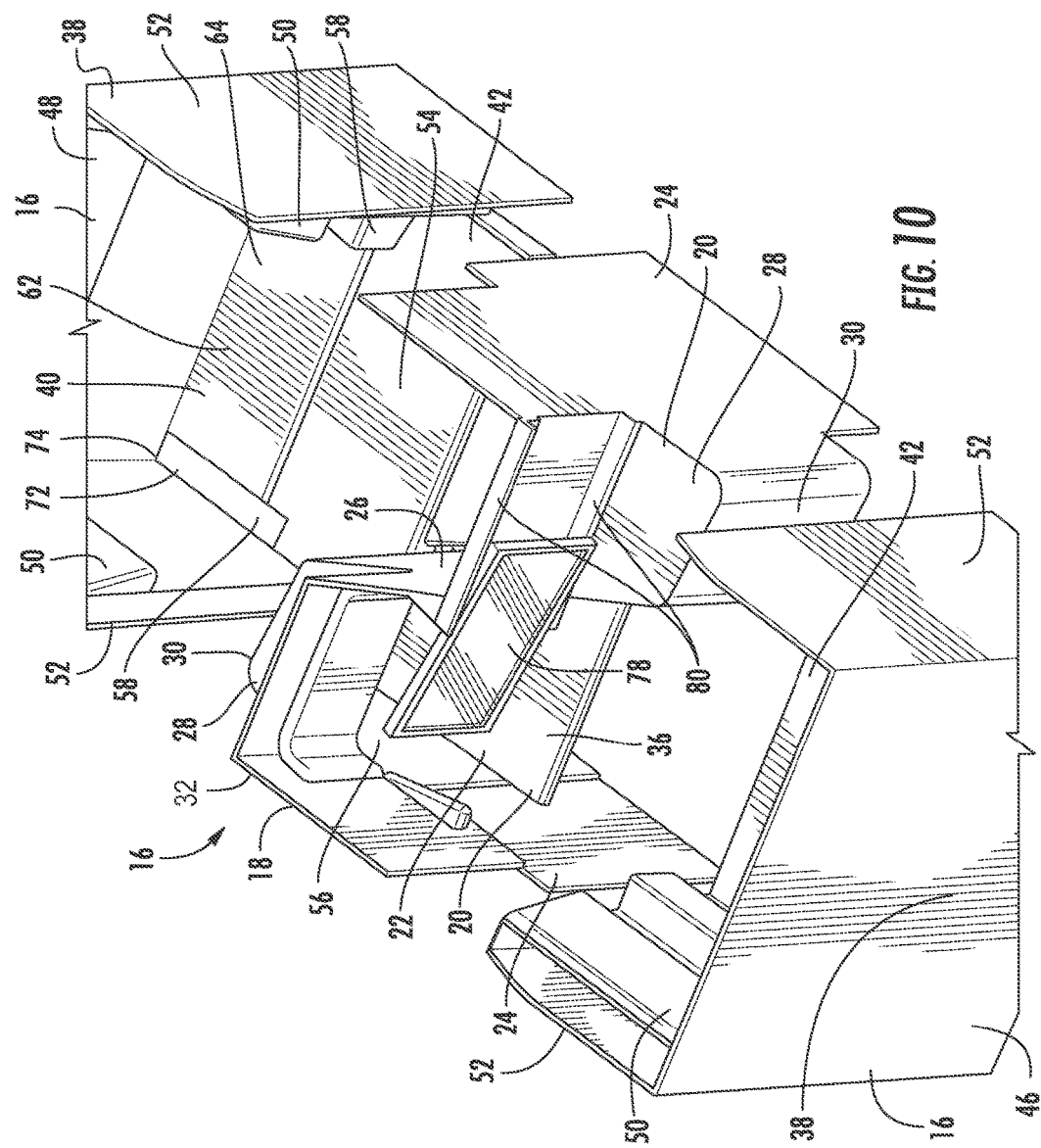
FIG. 10 is a perspective view of a seat unit showing one of the seats in a bed position and a monitor in a deployed position, according to certain embodiments of the present invention.

In the bed position, as illustrated in FIGS. 9-10, one or both armrests 58 may be configured to lower into a refracted position so that an upper surface 72 of one or both of the armrests 58 is substantially aligned with the bed surface 54, which further increases the amount of bed space available for each seat 16. In certain embodiments, since the longest diagonal is measured from a corner of the footwell 20 to an opposing corner 74 of the mating seat 16, it may desirable to lower the armrest 58 located in the opposing corner 74, while leaving the other armrest 58 in the raised position.

In other embodiments, one or both armrests 58 may include a cutout area 76 below the armrest 58 that is accessible when the seat 16 is in the bed position, thus providing the extra bed space in the cutout area 76 without the need to lower either armrest 58.

In certain embodiments, as shown in FIGS. 8-10 and 15, the monitor 78 for each seat 16 is mounted in a stowed location to a portion of the upper wall 32 located above the upper surface 28 of the opposing footwell 20. The monitor 78 may comprise a translation mechanism 80 that allows the monitor 78 to be moved into a deployed position, which comprises any suitable orientation or location that allows the monitor 78 to be viewed by a passenger seated in the mating seat 16. For example, the monitor 78 may be extended laterally into the deployed position where the monitor is positioned above the mating footwell 20. The monitor 78 may also be pivotally attached to the translation mechanism 80 so that the monitor 78 may be rotated to align with a viewing angle of a passenger seated or reclined at an angle to the longitudinal axis Y of the seat unit 14. In these embodiments, the monitor 78 may be positioned in the stowed position above the upper surface 28 of the opposing footwell 20 for viewing in the stowed position, when not in use, and/or when the secondary seat 36 is being occupied by another passenger.

In additional embodiments, as shown in FIGS. 1, 7, and 14, the monitor 78 for each seat 16 may be mounted to a portion of the upper wall 32 located above the stationary lower surface 22 of the mating footwell 20. As described above, the monitor 78 may be pivotally attached to the upper wall 32 so that the monitor 78 may be rotated to align with a viewing angle of a passenger that is seated or reclined at an angle to the longitudinal axis Y of the seat unit 14. In these embodiments, the monitor 78 may be positioned within a recess 82 in the upper wall 32 for viewing in the stowed position, when not in use, and/or when the secondary seat 36 is being occupied by another passenger. In further embodiments, the monitor 78 may be mounted in the center of the upper wall 32.

Figure 11:
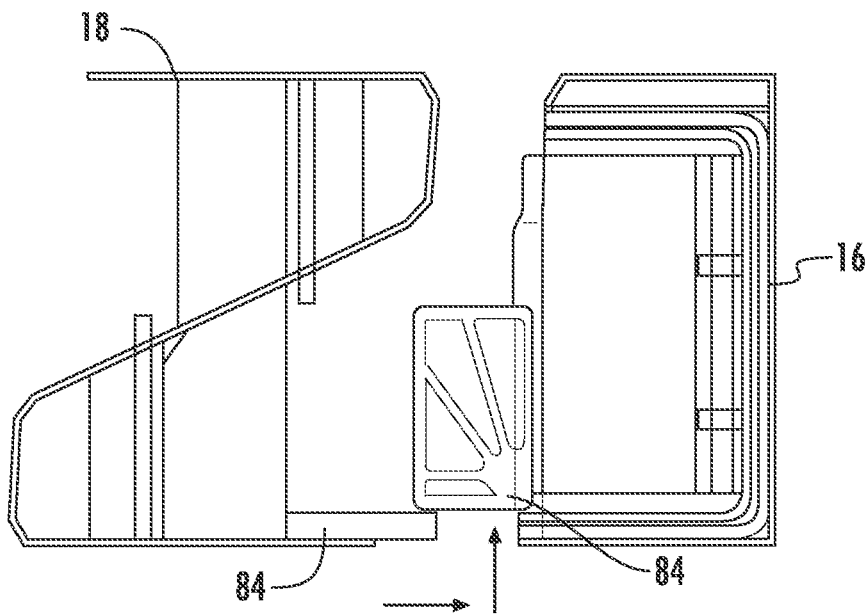
FIG. 11 is a top view of a seat unit showing a stowed position and a deployed position of a tray table, according to certain embodiments of the present invention.

In certain embodiments, each seat unit 14 comprises a tray table 84 for each seat 16. In some embodiments, as shown in FIG. 11, the tray table 84 may be stowed on a side of the footwell 20 for use by a passenger seated in the mating seat 16. The tray table 84 may include a translation mechanism that allows the tray table 84 to be pulled toward the mating seat 16, and then lifted and laterally rotated into a substantially horizontal position in front of the mating seat 16.

Figure 12A:
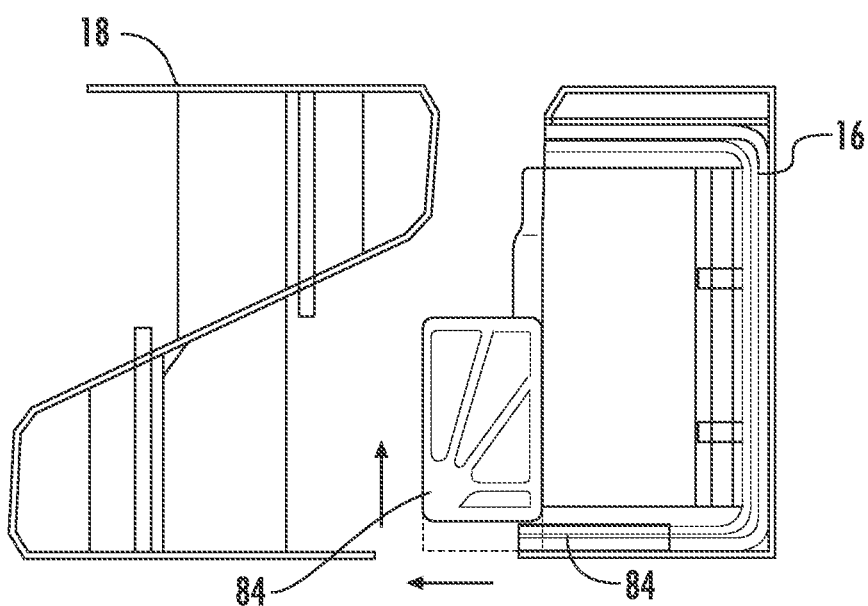
FIG. 12A is a top view of a seat unit showing a stowed position and a deployed position of a tray table, according to certain embodiments of the present invention.
Figure 12B:
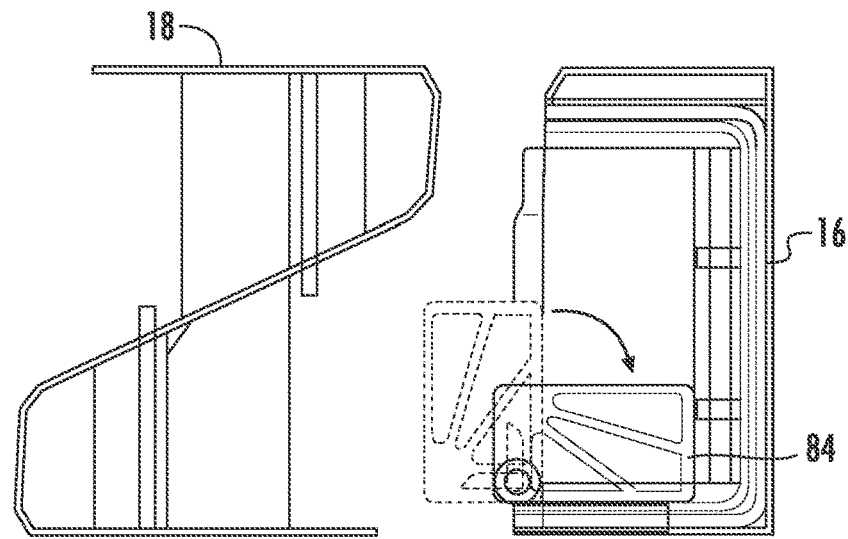
FIG. 12B is a top view of the seat unit of FIG. 12A, showing the tray table in a side table position.

In additional embodiments, as shown in FIG. 12A-12B, the tray table 84 may be stowed on a side of each seat 16. The tray table 84 may include a translation mechanism that allows the tray table 84 to be pulled away from the seat 16, and then lifted and laterally rotated into a substantially horizontal position in front of the mating seat 16. Once in the horizontal position, the tray table 84 may be further rotated toward the passenger seat so that the tray table 84 may be positioned as a cocktail table or other side table adjacent a passenger seated in the mating seat 16.

Figure 13:
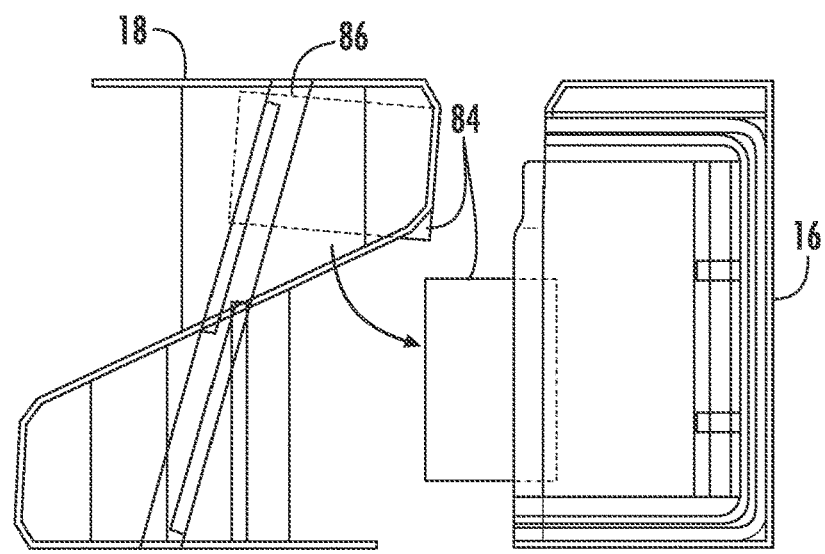
FIG. 13 is a top view of a seat unit showing a stowed position and a deployed position of a tray table, according to certain embodiments of the present invention.

In further embodiments, as shown in FIG. 13, the tray table 84 may be stowed in a substantially horizontal position within a recess 86 of the footwell 20 of the opposing seat 16. The tray table 84 may then be rotated out the footwell 20 and positioned into a substantially horizontal position in front of the mating seat 16.

In certain embodiments, as shown in FIGS. 7 and 14, the seat unit 14 comprises a closet 88 for each seat 16. The closet 88 may be positioned adjacent one of the side walls 52 of each seat 16, such as the side wall 52 that is adjacent an aisle 90 of the cabin 10.

In certain embodiments, one of the seats 16 has aisle access adjacent the opposing footwell 20, while the other seat 16 has aisle access adjacent the mating footwell 20. In these embodiments, the space between the seat 16 and the opposing footwell 20 may be narrower than the space between the seat 16 and the mating footwell 20, as best illustrated in FIG. 14. Thus, to provide more space for entrance/egress in the narrower opening, the closet 88 adjacent the narrower opening may be shifted by a distance B so as to extend past the rear wall 46 of the seat unit 14 and overlap by a distance A with the side wall 52 of an opposing seat 16 of another seat unit 14, illustrated in FIG. 14.

Figure 15:
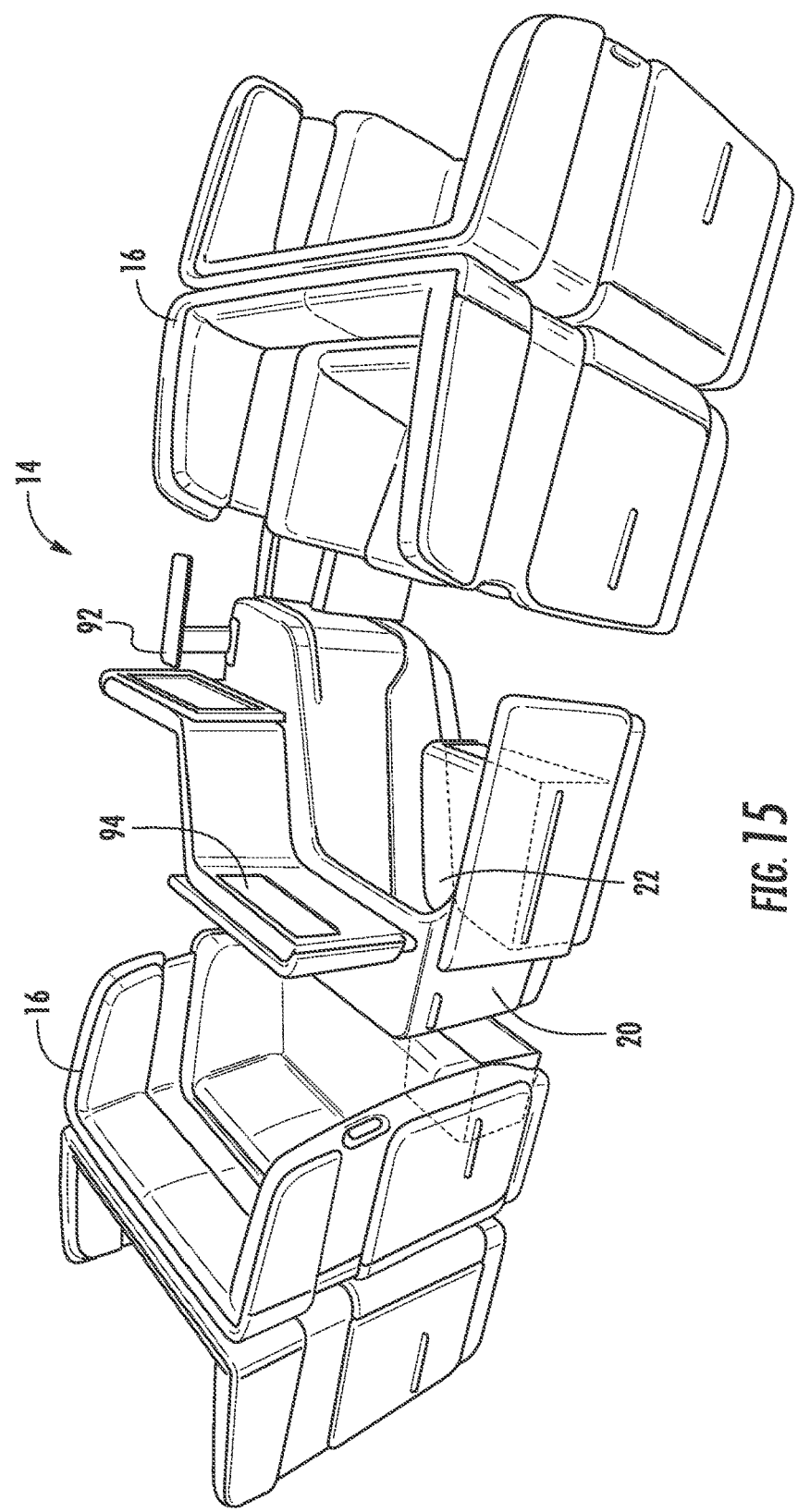
FIG. 15 is a perspective view of a seat unit showing locations of various stowage and other accessory options, according to certain embodiments of the present invention.

Additional amenities within each seat unit 14 may include additional under-seat stowage and under-footwell/secondary seat stowage, as shown in FIG. 15. The space between the seat 16 and the partition 18 on the non-aisle access side may be enclosed with additional stowage for amenities and other personal items, as well as water bottles or other similar items. In some embodiments, the stationary lower surface 22 may be equipped with a reading light 92. In certain embodiments, the side of the upper wall 32 where the monitor 78 is not mounted for stowage may further comprise an amenity pocket 94 or other stowage.

In some embodiments, as illustrated in FIGS. 2-6, the arrangement 12 comprises two columns 100A, 100B of seat units 14, each positioned along a wall of the cabin 10, and a central group 96 formed of two columns 100C, 100D of side-by-side seat units. However, a person of ordinary skill in the relevant art will understand that this is but one possible arrangement of columns, and that greater or fewer columns may be included in the cabin 10 as needed or desired to achieve the appropriate cabin density.

For purposes of the application, the terms "next-front" and "next-back" refer locally to the relative location of the seat units 14 within each column 100A, 100B, 100C, 100D, and does not refer to the orientation of the seat units 14 with respect to the overall cabin 10. In other words, the term "next-front seat unit" means that the seat unit 14 is located directly in front of another seat unit 14 within one or more of the columns 100A, 100B, 100C, 100D, and the term "next-back seat unit" means that the seat unit 14 is located directly behind another seat unit 14 within one or more of the columns 100A, 100B, 100C, 100D, but neither term is intended to refer to a more global orientation of the seat units 14 within the cabin 10.

In other embodiments, the central group 96 may be arranged so that the columns 100C, 100D are staggered from one another so that the laterally adjacent seat units 14 are not laterally aligned and therefore do not produce a symmetrical mirror image. In other words, one of the columns 100C, 100D may be staggered a few inches toward the front or the back of the cabin 10 relative to the other one of the columns 100C, 100D. As a result, the entire arrangement 12 exhibits a staggered pattern.

The configuration of the seat units 14 shown in FIGS. 2-6 may be identical for all the passengers, according to certain embodiments. However, a person of ordinary skill in the relevant art will understand that it is not required that each of the seat units 14 be identical in every aspect, and in some cases, it may be desirable to have the seat units 14 differ from one another in certain locations within the cabin 10. For example, it may be desirable to provide wider seats 16 within the central columns 100C, 100D to increase the feeling of space and privacy for the central columns 100C, 100D, while providing narrower seats 16 within the window columns 100A, 100B.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat unit comprising:
   two seats arranged facing one another, the two seats being substantially laterally aligned with each other and with respect to a longitudinal axis of the seat unit, wherein each seat has a width that exceeds a conventional width of a business class passenger seat;
   a partition positioned between the two seats, wherein the partition comprises two footwells arranged facing in opposing directions so that an opening in each footwell is accessible by a passenger seated in one of the two seats that faces the opening in the footwell; and
   each seat comprising a seat back, a headrest, and a seat pan, wherein each of the two seats is configured to convert between a seat position and a bed position;
   wherein a lower surface of each footwell is arranged at substantially the same height so that the two footwells are arranged in a side-by-side configuration; and
   wherein each of the two footwells comprises an enclosed portion having an upper surface that is configured as a table for use by a passenger seated in the one of the two seats that does not face the opening of the corresponding footwell.

2. The seat unit of claim 1, where the partition further comprises an upper wall that extends above the two footwells, wherein a monitor is mounted to the upper wall.

3. The seat unit of claim 2, wherein the monitor is slidingly mounted to transition from a stowed location above the footwell with the opening facing away from the seat that faces the monitor to a deployed position above the footwell with the opening facing the seat that faces the monitor.

4. The seat unit of claim 1, wherein the lower surface of each of the two footwells also forms a secondary seat when the seat facing the opening in the footwell is in the seat position.

5. The seat unit of claim 1, wherein the bed position comprises a bed surface formed by at least the lower surface of the footwell, the seat pan, and the seat back in a substantially horizontal position.

6. The seat unit of claim 5, wherein each of the two seats further comprises at least one armrest coupled to a side wall of a shell partially surrounding each of the two seats.

7. The seat unit of claim 6, wherein the at least one armrest slides down into a retracted position substantially aligned with the bed surface.

8. The seat unit of claim 6, wherein the at least one armrest is positioned so that an upper surface of the at least one armrest is substantially aligned with an upper surface of the seat back in the seat position.

9. The seat unit of claim 1, wherein the seat back comprises at least one pivotally attached cushion that pivots outward into a position to form a supplemental armrest.

10. A seat unit comprising:
    two primary seats arranged facing in opposing directions, the two primary seats being substantially laterally aligned with each other and with respect to a longitudinal axis of the seat unit, wherein each primary seat comprises a seat back, a headrest, and a seat pan, has a width that exceeds a conventional width of a business class passenger seat, and is configured to convert between a seat position and a bed position; and
    a partition positioned between the two primary seats, wherein the partition comprises two footwells arranged facing in opposing directions so that an opening in each footwell is accessible by a passenger seated in one of the two seats that faces the opening in the footwell;
    wherein a portion of each footwell is enclosed by an upper surface; and
    wherein a lower surface of each footwell extends beyond the enclosed portion and forms a secondary seat, wherein the lower surface of each footwell is arranged at substantially the same height so that the two footwells are arranged in a side-by-side configuration.

11. The seat unit of claim 10, where the partition further comprises an upper wall that extends above the two footwells, wherein a monitor is mounted to the upper wall.

12. The seat unit of claim 11, wherein the monitor is slidingly mounted to transition from a stowed location above the footwell with the opening facing away from the seat that faces the monitor to a deployed position above the footwell with the opening facing the seat that faces the monitor.

13. The seat unit of claim 10, wherein the bed position comprises a bed surface formed by at least the lower surface of the secondary seat, the seat pan, and the seat back in a substantially horizontal position.

14. The seat unit of claim 13, wherein each of the two primary seats further comprises at least one armrest coupled to a side wall of a shell partially surrounding each of the two primary seats.

15. The seat unit of claim 14, wherein the at least one armrest slides down into a retracted position substantially aligned with the bed surface.

16. A seat unit comprising:
   two primary seats arranged facing in opposing directions, the two primary seats being substantially laterally aligned with each other and with respect to a longitudinal axis of the seat unit; and
   a partition positioned between the two primary seats, wherein the partition comprises two footwells arranged facing in opposing directions so that an opening in each footwell is accessible by a passenger seated in one of the two seats that faces the opening in the footwell;
   wherein a portion of each footwell is enclosed by an upper surface;
   wherein a lower surface of each footwell extends beyond the enclosed portion and forms a secondary seat, wherein the lower surface of each footwell is arranged at substantially the same height so that the two footwells are arranged in a side-by-side configuration; and
   wherein each of the two primary seats has a width that exceeds a conventional width of a business class passenger seat and is configured for a passenger to be seated in multiple orientations within each seat, which range from having his or her body oriented in a direction that is substantially parallel to the longitudinal axis of the seat unit to having his or her body oriented in a direction that is substantially perpendicular to the longitudinal axis of the seat unit.

17. The seat unit of claim 16, wherein each of the two primary seats further comprises a seat back and at least one armrest coupled to a side wall of a shell partially surrounding each of the two primary seats, the at least one armrest positioned so that an upper surface of the at least one armrest is substantially aligned with an upper surface of the seat back in a seat position.

18. The seat unit of claim 17, wherein the seat back comprises at least one pivotally attached cushion that pivots outward into a position to form a supplemental armrest.

* * * * *